US005758120A

United States Patent [19]
Kahle et al.

[11] Patent Number: 5,758,120
[45] Date of Patent: May 26, 1998

[54] METHOD AND SYSTEM FOR INCREASED SYSTEM MEMORY CONCURRENCY IN A MULTI-PROCESSOR COMPUTER SYSTEM UTILIZING CONCURRENT ACCESS OF REFERENCE AND CHANGE BITS

[75] Inventors: James Allan Kahle; John Stephen Muhich, both of Austin, Tex.; Richard Raphael Oehler, Somers, N.Y.; Edward John Silha, Austin, Tex.

[73] Assignee: Internatiional Business Machines Corporation, Armonk, N.Y.

[21] Appl. No.: 700,132

[22] Filed: Aug. 20, 1996

Related U.S. Application Data

[63] Continuation of Ser. No. 2,292, Jan. 8, 1993, abandoned.

[51] Int. Cl.$^6$ .......................... G06F 12/10; G06F 15/16
[52] U.S. Cl. ......................... 395/477; 395/415; 395/471
[58] Field of Search ............................... 395/415–417, 395/471, 472, 474–480, 200.08

[56] References Cited

U.S. PATENT DOCUMENTS

| | | | |
|---|---|---|---|
| 3,581,291 | 5/1971 | Iwamoto et al. | 395/425 |
| 3,735,360 | 5/1973 | Anderson et al. | 395/250 |
| 4,068,303 | 1/1978 | Monita | 395/400 |
| 4,293,910 | 10/1981 | Flusche et al. | 395/425 |
| 4,394,731 | 7/1983 | Flusche et al. | 395/425 |
| 4,463,420 | 7/1984 | Fletcher et al. | 395/425 |
| 4,520,441 | 5/1985 | Bandoh et al. | 395/425 |
| 4,577,274 | 3/1986 | Ho et al. | 395/425 |
| 4,669,043 | 5/1987 | Kaplinsky | 395/400 |
| 4,731,739 | 3/1988 | Woffinden et al. | 395/250 |
| 4,731,740 | 3/1988 | Eguchi | 395/400 |
| 4,792,895 | 12/1988 | Tallman | 395/375 |
| 4,811,206 | 3/1989 | Johnson | 395/400 |
| 4,885,680 | 12/1989 | Anthony et al. | 395/425 |
| 4,961,135 | 10/1990 | Uchihori | 395/400 |
| 5,023,776 | 6/1991 | Gregor | 395/425 |
| 5,075,848 | 12/1991 | Lai et al. | 395/425 |
| 5,317,705 | 5/1994 | Gannon et al. | 395/400 |
| 5,339,397 | 8/1994 | Eikill et al. | 395/400 |

FOREIGN PATENT DOCUMENTS

| | | |
|---|---|---|
| 60-134949 | 7/1985 | Japan. |
| 4-213136 | 8/1992 | Japan. |

OTHER PUBLICATIONS

Hwang, Kai, Faye Briggs. "Computer Architecture and Parallel Processing," McGraw Hill Company, 1984, New York p. 92.

WPI/Derwent, RD317806 (Anonymous) 10 Sep. 1990 *Abstract*.

IBM Technical Disclosure Bulletin, vol. 23, No. 12, May 1981 Hoffman et al., "Reference and Change Bit Recording".

*Primary Examiner*—Matthew M. Kim
*Attorney, Agent, or Firm*—Michael A. Davis, Jr.; Andrew J. Dillon

[57] ABSTRACT

A method and system for increasing memory concurrency in a multiprocessor computer system which includes system memory, multiple processors coupled together via a bus, each of the processors including multiple processor units for executing multiple instructions and for performing read, write and store operations and an associated Translation Lookaside Buffer (TLB) for translating effective addresses into real memory addresses within the system memory. Multiple page table entries are provided within a page table within the system memory which each include multiple individually accessible fields, an effective address and an associated real memory address for a selected system memory location. A reference bit is provided within a first individually accessible field in each page table entry and this reference bit is utilized to indicate if an associated system memory location has been accessed for a read or write operation. A change bit is provided within a second individually accessible field within each page table entry and this change bit is utilized to indicate if an associated system memory location has been modified by a write operation. By storing the reference bit and change bit in separate accessible fields the reference bit and change bit may be concurrently updated by multiple processors, increasing memory concurrency.

8 Claims, 4 Drawing Sheets

METHOD AND SYSTEM FOR INCREASED SYSTEM MEMORY CONCURRENCY IN A MULTI-PROCESSOR COMPUTER SYSTEM UTILIZING CONCURRENT ACCESS OF REFERENCE AND CHANGE BITS

This is a continuation of application Ser. No. 08/002,292 filed Jan. 8, 1993, now abandoned.

BACKGROUND OF THE INVENTION

1. Technical Field

The present invention relates in general to improved data processing systems and in particular to improved system memory concurrency in a multiprocessor computer system. Still more particularly, the present invention relates to an improved method and system for updating reference and change indicators for selected system memory locations within a multiprocessor computer system.

2. Description of the Related Art

Designers of modern state-of-the-art data processing systems are continually attempting to enhance the performance aspects of such systems. One technique for enhancing data processing system efficiency is the achievement of short cycle times and a low Cycles-Per-instruction (CPI) ratio. An excellent example of the application of these techniques to an enhanced data processing system is the International Business Machines Corporation RISC System/6000 (RS/6000) computer. The RS/6000 Systems is designed to perform well in numerically intensive engineering and scientific applications as well as in multi-user, commercial environments. The RS/6000 processor employs a multiscalar implementation, which means that multiple instructions are issued and executed simultaneously.

The simultaneous issuance and execution of multiple instructions requires independent functional units that can execute concurrently with a high instruction bandwidth. The RS/6000 System achieves this by utilizing separate branch, fixed point floating point processing units which are pipelined in nature. In such systems, a significant pipeline delay penalty may result from the execution of conditional branch instructions. Conditional branch instructions are instructions which dictate the taking of a specified conditional branch within an application in response to a selected outcome of the processing of one or more other instructions. Thus, by the time a conditional branch instruction propagates to a pipeline queue to an execution position within a queue, it will have been necessary to load instructions into the queue behind the conditional branch instruction prior to resolving the conditional branch in order to avoid run-time delays.

Another source of delays within multiscalar processor systems is the fact that such systems typically execute multiple tasks simultaneously. Each of these multiple tasks typically has an effective or virtual address space which is utilized for execution of that task. Locations within such an effective or virtual address space include addresses which "map" to a real address within system memory. It is not uncommon for a single space within real memory to map to multiple effective or virtual memory addresses within a multiscalar processor system. The utilization of effective or virtual addresses by each of the multiple tasks creates additional delays within a multiscalar processor system due to the necessity of translating these addresses into real addresses within system memory, so that the appropriate instruction or data may be retrieved from memory and placed within an instruction queue for dispatching to one of the multiple independent functional units which make up the multiscalar processor system.

One technique whereby effective or virtual memory addresses within a multiscalar processor system may be rapidly translated to real memory addresses within system memory is the utilization of a so-called "Translation Lookaside Buffer" (TLB). A Translation Lookaside Buffer (TLB) is a buffer which contains translation relationships between effective or virtual memory addresses and real memory addresses which have been generated utilizing a translation algorithm. While the utilization of Translation Lookaside Buffer (TLB) devices provides a reasonably efficient method of translating addresses, the utilization of such buffers in a tightly coupled symmetric multiprocessor system causes a problem incoherency. In data processing systems in which multiple processors may read from and write to a common system real memory care must be taken to ensure that the memory system operates in a coherent manner. That is, the memory system is not permitted to become incoherent as a result of the operations of multiple processors. Each processor within such a multiprocessor data processing system typically includes a Translation Lookaside Buffer (TLB) for address translation and the shared aspect of memory within such systems requires that changes to a single Translation Lookaside Buffer (TLB) within one processor in a multiprocessor system be carefully and consistently mapped into each Translation Lookaside Buffer within each processor within the multiprocessor computer system in order to maintain coherency.

The maintenance of Translation Lookaside Buffer (TLB) coherency in a prior art multiprocessor system is typically accomplished utilizing interprocessor interrupts and software synchronization for all Translation Lookaside Buffer (TLB) modifications. These approaches may be utilized to ensure coherency throughout the multiprocessor system; however, the necessity of utilizing interrupts and software synchronization results in a substantial performance degradation within a multiprocessor computer system. One technique for maintaining Translation Lookaside Buffer (TLB) coherency in a multiprocessor system is disclosed in U.S. patent application Ser. No. 07/959,189, filed Oct. 9, 1992, now U.S. Pat. No. 5,437,017.

In page memory systems, the content of each Translation Lookaside Buffer (TLB) within a multiprocessor system is reflective of the content of a page table maintained within system memory. A page table is generally a memory map table which includes either a virtual or effective memory address, or segment thereof, and a real memory address which is associated therewith. Various other administrative data are also typically contained within such page tables including: page protection bits, a valid entry bit and various access control bits. A reference and change bit are also typically provided within a page table and utilized to provide an indication of whether or not an associated memory page has been accessed for a read or write operation, or has been modified by a store operation.

In a single processor system no contention exists for possible changes to the reference and change bit, since only one processor may access these bits. However, in the multiprocessor system two or more processors may attempt to update the page table simultaneously. That is, one processor may update the reference bit while a second processor updates the change bit. Such a scenario may result in one of these bits being overwritten during an updating of the other bit. To prevent this situation, updates to the page tables within a multiprocessor system are typically accomplished utilizing locks or an atomic read-modify-write operation, in order to prevent a so-called "write hazard" to these status bits.

It should therefore be apparent that a need exists for a method and system which permits multiple processors to concurrently update the reference and change bits within a system memory page table in a multiprocessor computer system without creating a "write hazard" situation.

SUMMARY OF THE INVENTION

It is therefore one object of the present invention to provide an improved data processing system.

It is another object of the present invention to provide improved memory concurrency in a multiprocessor computer system.

It is yet another object of the present invention to provide an improved method and system for updating reference and change bit indicators for selected system memory locations within a multiprocessor computer system.

The foregoing objects are achieved as is now described. The method and system of the present invention may be utilized to increase memory concurrency in a multiprocessor computer system which includes system memory, multiple processors coupled together via a bus, each of the processors including multiple processor units for executing multiple instructions and for performing read, write and store operations and an associated Translation Lookaside Buffer (TLB) for translating effective addresses into real memory addresses within the system memory. Multiple page table entries are provided within a page table within the system memory which each include multiple individually accessible fields, an effective address and an associated real memory address for a selected system memory location. A reference bit is provided within a first individually accessible field in each page table entry and this reference bit is utilized to indicate if an associated system memory location has been accessed for a read or write operation. A change bit is provided within a second individually accessible field within each page table entry and this change bit is utilized to indicate if an associated system memory location has been modified by a write operation. By storing the reference bit and change bit in separate accessible fields the reference bit and change bit may be concurrently updated by multiple processors, increasing memory concurrency.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
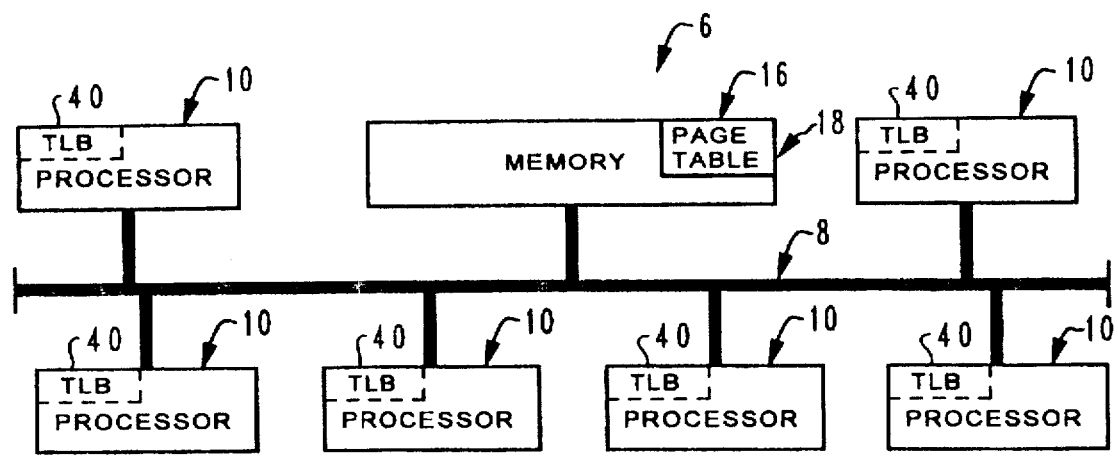
FIG. 1 is a high level block diagram depicting a multiprocessor data processing system which may be utilized to implement the method and system of the present invention.

With reference now to the figures and in particular with reference to FIG. 1, there is depicted a high level block diagram illustrating a multiprocessor data processing system 6 which may be utilized to implement the method and system of the present invention. As illustrated, multiprocessor data processing system 6 may be constructed utilizing multiscalar processors 10 which are each coupled to system memory 18 utilizing bus 8. In a tightly-coupled symmetric multiprocessor system, such as multiprocessor data processing system 6, each processor 10 within multiprocessor data processing system 6 may be utilized to read from and write to memory 18. Thus, systems and interlocks must be utilized to ensure that the data and instructions within memory 18 remain coherent. A page table 16 is preierably provided within memory 18 and multiple entries therein may be utilized to efficiently map effective addresses to real addresses within memory 118 as those skilled in the art will appreciate.

As illustrated within FIG. 1, and as will be explained in greater detail herein, each processor 10 within multiprocessor data processing system 6 includes a translation lookaside buffer (TLB) 40 which may be utilized to efficiently translate effective or virtual addresses for instructions or data into real addresses within memory 18 by replicating that information contained within portions of page table 18.. In view of the fact that a translation lookaside buffer (TLB) constitutes a memory space, it is important to maintain coherency among each translation lookaside buffer (TLB) 40 within multiprocessor data processing system 6 in order to assure accurate operation thereof.

Figure 2:
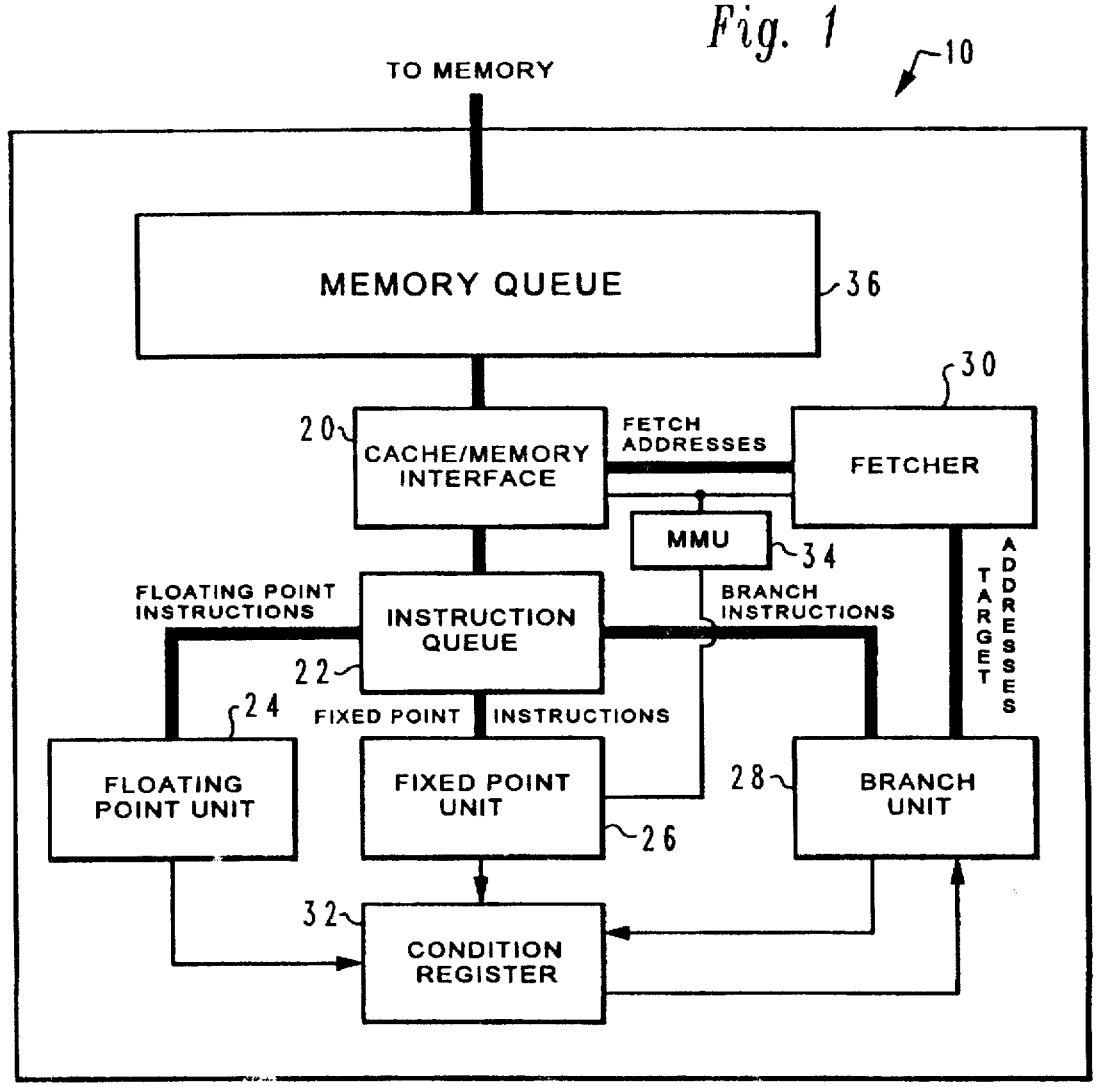
FIG. 2 is a high level block diagram depicting one multiscalar processor within the multiprocessor data processing system of FIG. 1.

Referring now to FIG. 2, there is depicted a high level block diagram of a multiscalar processor 10 which may be utilized to provide multiprocessor data processing system 6 of FIG. 1. As illustrated, multiscalar processor 10 preferably includes a memory queue 36 which may be utilized to store data, instructions and the like which are read from or written to memory 18 (see FIG. 1) by multiscalar processor 10. Data or instructions stored within memory queue 36 are preferably accessed utilizing cache/memory interface 20 in a method well known to those having skill in the art. The sizing and utilization of cache memory systems ia well known subspecially within the data processing art and not addressed within the present application. However, those skilled in the art will appreciate that by utilizing modern associated cache techniques a large percentage of memory accesses may be achieved utilizing data temporarily stored within cache/memory interface 20.

Instructions from cache/memory interface 20 are typically loaded into instruction queue 22 which preferably includes a plurality of queue positions. In a typical embodiment of a multiscalar computer system the instruction queue may include eight queue positions and thus, in a given cycle, between zero and eight instructions may be loaded into instruction queue 22, depending upon how many valid instructions are passed by cache/memory interface 20 and how much space is available within instruction queue 22.

As is typical in such multiscalar processor systems, instruction queue 22 is utilized to dispatch instructions to multiple execution units. As depicted within FIG. 2, multiscalar processor 10 includes a floating point processor unit 24, a fixed point processor unit 26, and a branch processor unit 28. Thus, instruction queue 22 may dispatch between zero and three instructions during a single cycle, one to each execution unit.

In addition to sequential instructions dispatched from instruction queue 22, so-called "conditional branch instructions" may be loaded into instruction queue 22 for execution by the branch processor. A conditional branch instruction is an instruction which specifies an associated conditional branch to be taken within the application in response to a selected outcome of processing one or more sequential instructions. In an effort to minimize run-time delay in a pipelined processor system, such as multiscalar processor 10, the presence of a conditional branch instruction within the instruction queue is detected and an outcome of the conditional branch is predicted. As should be apparent to those having skill in the art when a conditional branch is predicted as "not taken" the sequential instructions within the instruction queue simply continue along a current path and no instructions are altered. However, if the prediction as to the occurrence of the branch is incorrect, the instruction queue must be purged of sequential instruction, which follow the conditional branch instruction in program order and target instructions must be fetched. Alternately, if the conditional branch is predicted as "taken" then the target instructions are fetched and utilized to follow the conditional branch, if the prediction is resolved as correct. And of course, if the prediction of "taken" is incorrect the target instructions must be purged and the sequential instructions which follow the conditional branch instruction in program order must be retrieved.

As illustrated, multiscalar processor 10 also preferably includes a condition register 32. Condition register 32 is utilized to temporarily store the results of various comparisons which may occur utilizing the outcome of sequential instructions which are processed within multiscalar processor 10. Thus, floating point processor unit 24, fixed point processor unit 26 and branch processor unit 28 are all coupled to condition register 32. The status of a particular condition within condition register 32 may be detected and coupled to branch processor unit 28 in order to generate target addresses, which are then utilized to fetch target instructions in response to the occurrence of a condition which initiates a branch.

Thereafter, a branch processor unit 28 couples target addresses to fetcher 30. Fetcher 30 calculates fetch addresses for the target instructions necessary to follow the conditional branch and couples those fetch addresses to cache/memory interface 20. As will should appreciated by those having skill in the art, if the target instructions associated with those fetch addresses are present within cache/memory interface 20, those target instructions are loaded into instruction queue 22. Alternately, the target instructions may be fetched from memory 18 and thereafter loaded into instruction queue 22 from cache/memory interface 20 after a delay required to fetch those target instructions.

As those skilled in the art will appreciate, each task within multiscalar processor 10 will typically have associated therewith an effective or virtual memory space and instructions necessary to implement each task will be set forth within that space utilizing effective or virtual addresses. Thus, fetcher 30 must be able to determine the real address for instructions from the effective addresses utilized by each task. As described above, prior art implementations of fetcher 30 typically either incorporate a complex translation lookaside buffer (TLB), sequence register and multiple translation algorithms or, alternately, such instruction fetchers are required to access a memory management unit (MMU) having such complex translation capability in order to determine real instruction addresses from effective or virtual instruction addresses.

Also depicted within multiscalar processor 10 is memory management unit (MMU) 34. Memory management unit, as will be described in greater detail herein, preferably includes a translation lookaside buffer (TLB) and all necessary registers and translation algorithms which may be utilized to translate each effective address within multiscalar processor 10 into real address within system memory 18. Fetcher units typically have a very low priority for accessing a memory management unit (MMU) and therefore some delay is expected in the obtaining of real instruction address utilizing a memory management unit (MMU).

Figure 3:
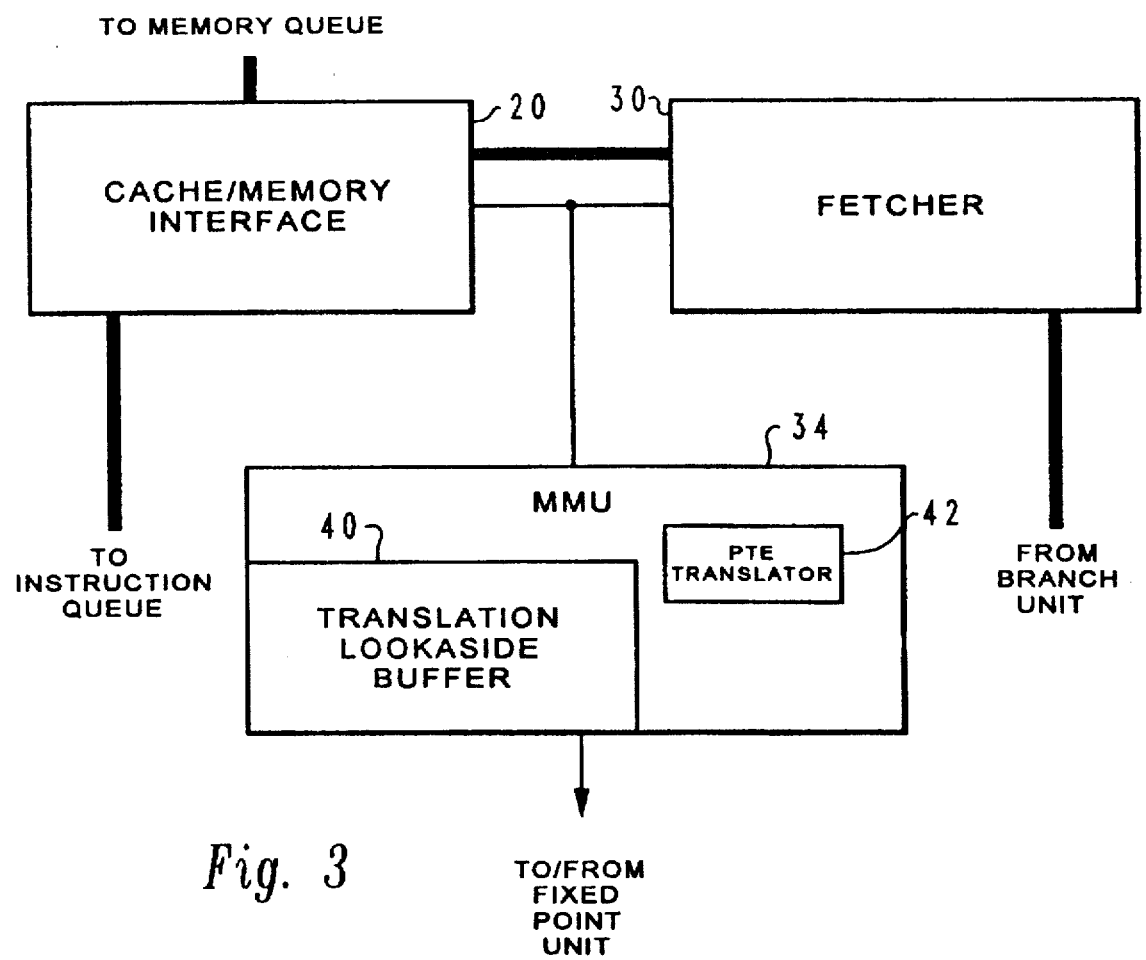
FIG. 3 is a more detailed block diagram depicting a Translation Lookaside Buffer (TLB) and Memory Management Unit (MMU) within the multiscalar processor of FIG. 2.

With reference now to FIG. 3, there is depicted a more detailed block diagram illustrating a translation lookaside buffer (TLB) and memory management unit (MMU) within multiscalar processor 10 of FIG. 2. As illustrated within FIG. 3, the relationship between cache/memory interface 20, fetcher 30 and memory management unit (MMU) 34 is depicted. As is typical in known memory management units, memory management unit (MMU) 34 includes a substantially sized translation lookaside buffer (TLB) 40. Those skilled in the art will appreciate that a translation lookaside buffer (TLB) is often utilized as a fairly rapid technique for translating from effective or virtual address to real address. Also present within memory management unit (MMU) 34 is PTE translator 42. PTE translator 42 is preferably utilized to implement a page table type translation. Those skilled in the art will appreciate that a page table translation occurs within a system having consistently sized memory pages.

Thus, upon reference to FIG. 3, those skilled in the art will appreciate that by utilizing translation lookaside buffer (TLB) 40 in conjunction with PTE translator 42, all effective addresses within multiscalar processor 10 (see FIG. 2), which utilizes the page table translation may be translated into a real address within system memory.

As those skilled in the art will appreciate fetcher 30 is utilized to couple fetch addresses to cache/memory interface 20 for target instructions which are selected by branch unit 28. For each target address coupled to fetcher 30 from branch unit 28 a fetch address is determined and coupled to cache/memory interface 20. In the depicted embodiment of the present invention, these addresses may often be determined by accessing translation lookaside buffer (TLB) 40 within memory management unit 34. Thus, it should be apparent that in order to maintain coherence within each multiscalar processor 10 within multiprocessor data processing system 6 it will be necessary to maintain coherence between each translation lookaside buffer (TLB) 40 within each multiscalar processor 10.

Figure 4:
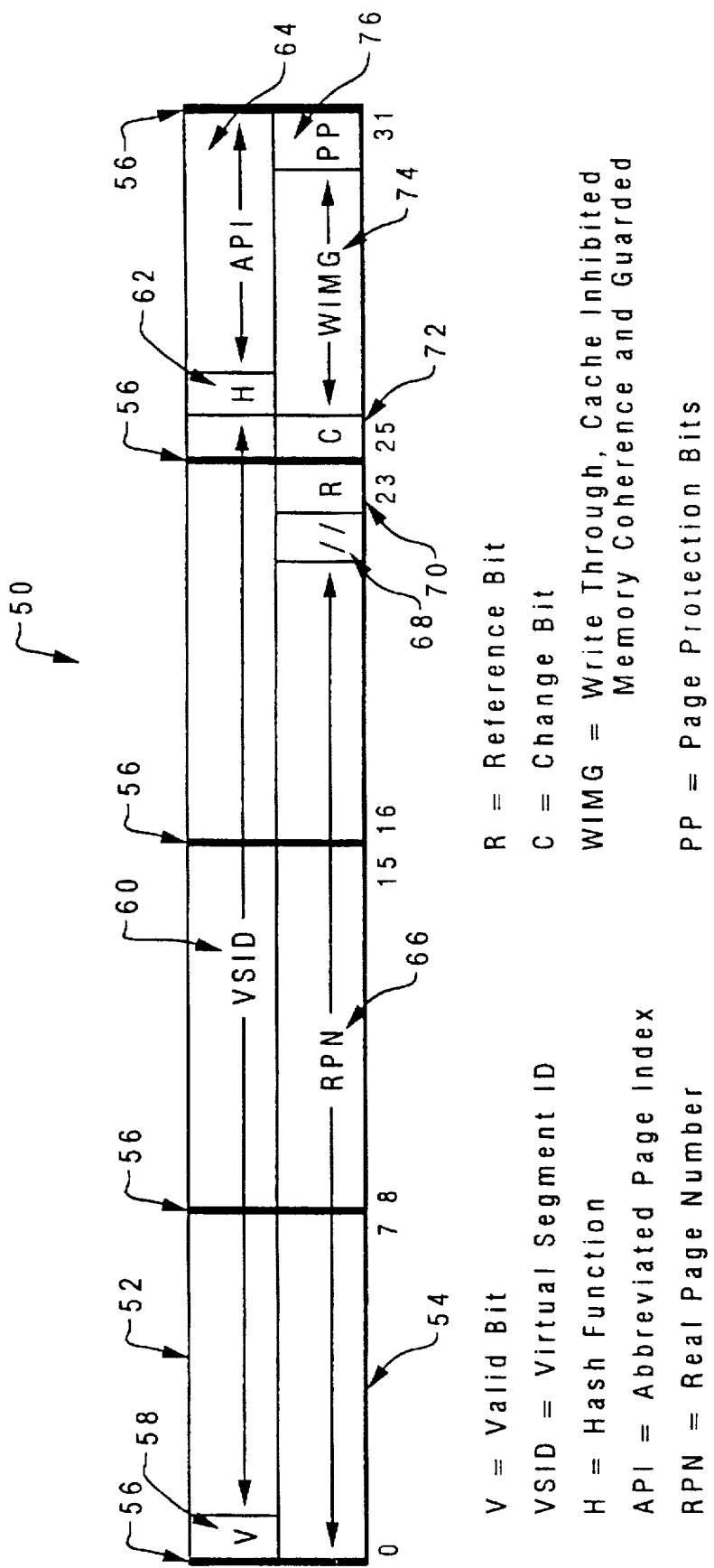
FIG. 4 is a pictorial illustration of a single page table entry provided in accordance with the method and system of the present invention.

Referring now to FIG. 4 there is depicted a pictorial illustration of a single page table entry 50 which is provided in accordance with the method and system of the present invention. As illustrated, the particular embodiment of page table entry 50 which is depicted within FIG. 4 comprises two thirty-two bit words. Namely, thirty-two bit word 52 and thirty-two bit word 54. In the embodiment depicted within FIG. 4 each thirty-two bit word is further subdivided along eight bit bytes as illustrated at each byte boundary 56. Thus, those having skill in the art will appreciate that when utilizing a system which permits individual bytes of memory to be accessed each eight bit field contained within a byte within a thirty-two bit word may be individually accessed.

Page table entry 50 is maintained within memory 18 (see FIG. 1) and is utilized, in a manner well known to those having skill in the art, to provide a translation between an effective or virtual memory address and a real address within system memory 18. Thus, page table entry 50 may include multiple examples of translation information and other administrative data. In the depicted embodiment contained within FIG. 4, a valid entry bit is provided at reference numeral 58. This bit may be utilized to indicate whether or not the particular page table entry 50 which is illustrated is a valid entry. Next, a virtual segment identification is illustrated at reference numeral 60. Those having skill in the art will appreciate that a page memory system may utilize several different techniques to map virtual or effective addresses to real addresses and that virtual segment identification 60 may comprise an actual virtual address or some portion thereof which is concatenated with additional information to form an actual virtual address. A hash function ID is depicted at reference numeral 62 and is utilized to determine the particular hash function utilized to store data within the page table. Lastly, thirty-two bit word 52 includes an abbreviated page index 64.

Thirty-two bit word 54 preferably includes a real page number 66 and, unused bits 68. Next, in accordance with an important feature of the present invention, reference indicator bit 70 is stored within one individually accessible byte within thirty-two bit word 54. Thereafter, change bit 72 is stored within an alternate individually accessible byte within thirty-two bit word 54. Thus, by storing reference indicator bit 70 and change indicator bit 72 on opposite sides of a byte boundary 56, reference indicator bit 70 and change indicator bit 72 may be individually accessed and updated by multiple processors within a multiprocessor computer system. By placing reference indicator bit 70 and change indicator bit 72 within different individually accessible bytes within page table entry 50, the necessity of locking other processor accesses during an updating of one of these indicator bits or the requirement to perform an atomic read-modify-write operation is eliminated. Thus, concurrency may be greatly enhanced by permitting reference indicator bit 70 and change indicator bit 72 to be concurrently accessed and updated by multiple processors.

Finally, WIMG storage access controls 74 and page protection bits 76 are also stored within page table entry 50. Of course, those having skill in the art will appreciate that the form and format of each page table entry within a page table may vary substantially while taking advantage of the method and system of the present invention so long as the reference bit and change indicator bit are stored within separate individually accessible fields within the page table entry.

Figure 5:
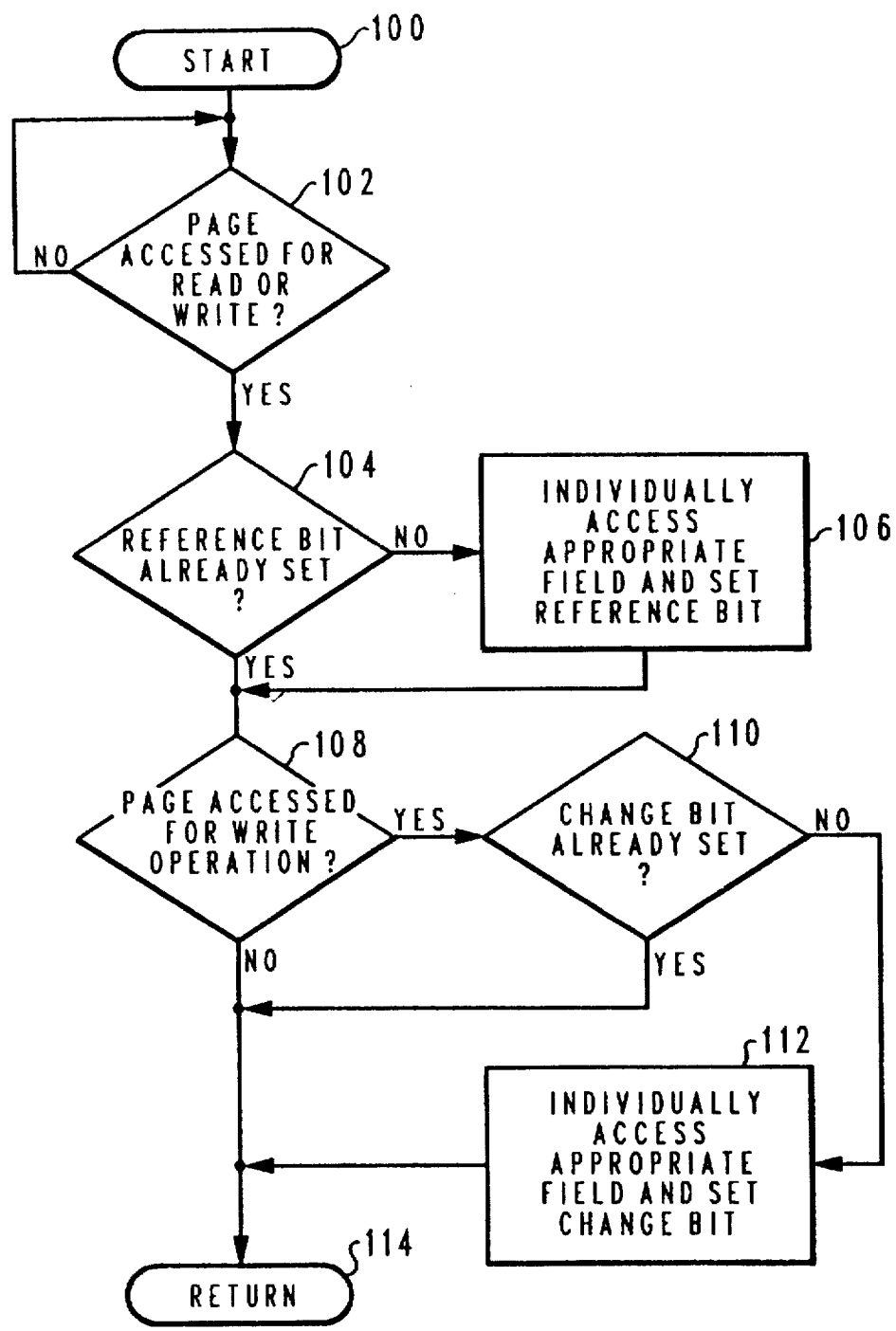
FIG. 5 is a high level logic flowchart illustrating the updating of the reference and change bit indicators within a page table entry in accordance with the method and system of the present invention.

Finally, with reference to FIG. 5 there is depicted a high level logic flowchart which illustrates the updating of the reference indicator bit and change indicator bit within a page table entry in accordance with the method and system of the present invention. As depicted, the process begins at block 100 and thereafter passes to block 102. Block 102 illustrates a determination of whether or not a page of memory has been accessed for a read or write. If so, the process passes to block 104. Block 104 illustrates a determination of whether or not the reference indicator bit associated with that particular location within system memory is already set and if not, the process passes to block 106. Block 106 illustrates the individual accessing of the appropriate field within the page table entry and the setting of the reference bit. Thereafter, or in the event the reference bit is already set, the process passes to block 108. Block 108 illustrates a determination of whether or not the page has been accessed for a write operation. If not, the process merely returns as illustrated at block 114.

Still referring to block 108, in the event the page of system memory has been accessed for a write the process passes to block 110. Block 110 illustrates a determination of whether or not the change indicator bit is already set and if so, the process merely returns, as illustrated at block 114. Still referring to block 110, in the event the change indicator bit is not already set the process passes to block 112. Block 112 illustrates the individual accessing of the appropriate field within the page table entry and the setting of the change indicator bit, indicating that the data within that page has been modified by a store operation. The process then returns, as described above, at block 114.

Upon reference to the foregoing those skilled in the art will appreciate that the applicants herein have provided a novel method and system whereby system memory concurrency may be increased by permitting multiple processors to concurrently access and update a reference indicator bit and change indicator bit within a page table within system memory, without requiring locks which prohibit simultaneous access by multiple processors and without requiring the performance of an atomic read-modify-write operation.

While the invention has been particularly shown and described with reference to a preferred embodiment, it will be understood by those skilled in the art that various changes in form and detail may be made therein without departing from the spirit and scope of the invention.

We claim:

1. A method for increased system memory concurrency in a multiprocessor computer system having a system memory, a plurality of processors coupled together via a bus, each of said plurality of processors including multiple processor units for executing multiple instructions and for performing read and write operations, and an associated translation lookaside buffer for translating effective addresses into real memory addresses within said system memory, said method comprising the steps of:

providing a memory map table having multiple entries within said system memory, each entry within said memory map table including multiple individually accessible fields;

storing an effective address and an associated real memory address for a selected system memory location within each of said memory map table entries;

storing a reference indicator within a first of said multiple individually accessible fields within each of said memory map table entries, said reference indicator indicating if a selected system memory location has been accessed for a read or write operation;

storing a change indicator within a second of said multiple individually accessible fields within each of said memory map table entries, said change indicator indicating if a selected system memory location has been modified by a write operation; and accessing said reference indicator within a first memory map table entry utilizing a first of said plurality of processors while said change indicator within said first memory map table entry is concurrently accessed by a second of said plurality of processors wherein system memory concurrency is increased.

2. The method for increased system memory concurrency in a multiprocessor computer system according to claim 1, wherein said step of providing a memory map table having multiple entries within said system memory, each of said entries within said memory map table including multiple individually accessible fields comprises the step of providing a plurality of thirty-two bit memory map table entries, each including four eight bit individually accessible fields.

3. The method for increased system memory concurrency in a multiprocessor computer system according to claim 1, wherein said step of storing a reference indicator within a first of said multiple individually accessible fields within each of said memory map table entries comprises the step of storing a reference indicator bit within a first of said multiple individually accessible fields within each of said memory map table entries.

4. The method for increased system memory concurrency in a multiprocessor computer system according to claim 1, wherein said step of storing a change indicator within a second of said multiple individually accessible fields within each of said memory map table entries comprises the step of storing a change indicator bit within a second of said multiple individually accessible fields within each of said memory map table entries.

5. A system for increased system memory concurrency in a multiprocessor computer system having a system memory, a plurality of processors coupled together via a bus, each of said plurality of processors including multiple processor units for executing multiple instructions and for performing read and write operations, and an associated translation lookaside buffer for translating effective addresses into real memory addresses within said system memory, said system comprising:

a memory map table including a plurality of memory map table entries, each of said memory map table entries including multiple individually accessible fields;

an effective address and an associated real address for a selected system memory location stored within each of said memory map table entries;

a reference indicator stored within a first of said multiple individually accessible fields within each of said memory map table entries, said reference indicator indicating if a selected system memory location has been accessed for a read or write operation;

a change indicator stored within a second of said multiple individually accessible fields within each of said memory map table entries, said change indicator indicating if a selected system memory location has been modified by a write operation; and a first of said plurality of processors for accessing said reference indicator within a first memory map table entry while said change indicator within said first memory map table entry is concurrently accessed by a second of said plurality of processors wherein system memory concurrency is increased.

6. The system for increased system memory concurrency according to claim 5, wherein each of said plurality of memory map table entries comprises a plurality of thirty-two bit memory map table entries, each including four eight-bit individually accessible fields.

7. The system for increased system memory concurrency according to claim 5, wherein said reference indicator comprises a single reference indicator bit.

8. The system for increased system memory concurrency according to claim 5, wherein said change indicator comprises a single change indicator bit.

* * * * *